United States Patent [19]

Stables et al.

[11] Patent Number: 4,476,729
[45] Date of Patent: Oct. 16, 1984

[54] APPARATUS FOR MEASURING GAS VELOCITY

[75] Inventors: Wilbur L. Stables, Matoaca; James J. Cooksey, Colonial Heights; Harry L. Newell, Jr., Richmond, all of Va.

[73] Assignee: Allied Corporation, Morris Township, Morris County, N.J.

[21] Appl. No.: 384,367

[22] Filed: Jun. 2, 1982

[51] Int. Cl.$^3$ ............................ G01F 1/42; G01F 1/46
[52] U.S. Cl. ................................. 73/861.61; 73/861.65
[58] Field of Search ................ 73/198, 861.61, 861.63, 73/861.64, 861.65, 861.66

[56] References Cited

U.S. PATENT DOCUMENTS

| | | | |
|---|---|---|---|
| 1,145,234 | 7/1915 | Dodge | 73/861.66 |
| 1,249,601 | 12/1917 | DeFerranti | 73/861.64 |
| 2,929,248 | 3/1960 | Sprenkle | 73/198 |
| 3,636,765 | 1/1972 | Brown . | |
| 3,733,898 | 5/1973 | Yamamoto et al. . | |
| 3,981,193 | 9/1976 | Goulet | 73/861.66 |
| 4,130,017 | 12/1978 | Benedict et al. . | |
| 4,280,360 | 7/1981 | Kobayashi et al. | 73/198 |
| 4,372,170 | 2/1983 | Dehart et al. | 73/861.65 X |
| 4,372,171 | 2/1983 | Brant, Jr. | 73/861.61 X |

*Primary Examiner*—Herbert Goldstein

[57] ABSTRACT

Apparatus for determining the velocity of a gas in a gas supply duct is provided. The apparatus comprises a flow nozzle and a pitot tube. The flow nozzle has an inlet opening for receiving the gas and an outlet opening for expelling the gas after it has accelerated through a throat connecting the openings. The throat narrows in a curve from the inlet opening to outlet opening. The nozzle is mounted in the duct coaxially in a fluid-tight relationship therewith, the cross-sectional area of the duct and the cross-sectional area of the inlet opening being substantially identical. The cross-sectional area of the outlet opening is 40 to 60 percent that of the duct. The pitot tube comprises an impact tube and a static tube mounted in parallel through the duct downstream of the nozzle and both bending upstream toward the nozzle parallel to the duct axis. The opening of the impact tube is located in the volume bound by the cross-sectional area of the outlet opening and a distance of up to 6.25 percent of the duct inside diameter downstream of the outlet opening. The static tube has a plurality of apertures in the portion located in the volume bounded by the cross-sectional area of the outlet opening and a distance of up to 12.5 percent of the duct inside diameter downstream of the outlet opening.

1 Claim, 2 Drawing Figures

APPARATUS FOR MEASURING GAS VELOCITY

BACKGROUND OF THE INVENTION

1. Field of the Invention

This invention relates to apparatus for the accurate determination of velocity of a gas in a gas supply duct, more particularly so that gas flow rate may be maintained uniform between the individual ducts supplying gas to their respective plenum chambers for delivery to quenching chambers for the quenching of synthetic filaments produced by a melt-spinning process.

2. The Prior Art

Each spinning position in a melt-spinning process has a quenching chamber to which gas is supplied through a plenun chamber from a supply duct. See, for example, U.S. Pat. No. 3,999,910 to Pendlebury et al., hereby incorporated by reference. A plurality of positions are normally located in side-by-side relationship with their gas supply ducts fed by a header. Unfortunately, the supply ducts are not of uniform length, and some have elbows and/or butterfly valves therein, which create turbulence in the gas supply duct. A single point pitot tube has been used to measure the gas velocity in the duct just prior to entry to the plenum chamber. The velocity measurement is then converted to determine the gas flow rate in cubic feet per minute. If the velocity measurement is not representative of the gas velocity in the duct, however, an inaccurate determination of flow rate will result, and an attempt at maintaining the flow rates uniform on a plurality of positions will fail. The result is seen in differing yarn physicals for the process product. It was therefore necessary to devise apparatus which would make more accurate the determination of the gas velocity. In a duct or pipe of straight length greater than ten times the inside diameter of the duct prior to measurement, a differential pressure cell combined with an orifice plate will suffice. However, when the straight length is ten times the inside diameter of the duct or less prior to measurement, this combination is insufficient.

Prior art believed to be pertinent to the examination of the present invention is U.S. Pat. Nos. 4,130,017 to Benedict et al., 3,733,898 to Yamamoto et al., and 3,636,765 to Brown, all of which are hereby incorporated by reference.

SUMMARY OF THE INVENTION

The present invention provides apparatus for more accurately determining the velocity of a gas in a gas supply duct. The apparatus comprises a flow nozzle and a pitot tube. The flow nozzle has an inlet opening for receiving the gas and an outlet opening for expelling the gas after it has been accelerated through a throat connecting the inlet opening and the outlet opening. The throat narrows in a curve from the inlet opening to the outlet opening. The nozzle is mounted in the duct coaxially and in fluid-tight relationship therewith. The cross-sectional area of the duct and the cross-sectional area of the inlet openings are substantially identical. The cross-sectional area of the outlet opening is 40 to 60, more preferably 50, percent that of the duct.

The pitot tube comprises an impact tube and a static tube mounted in parallel through the duct downstream of the nozzle and both bending upstream toward the nozzle parallel to the duct axis. The opening of the impact tube is located in the volume bounded by the cross-sectional area of the outlet opening and a distance of up to 6.25 percent of the duct inside diameter downstream of the outlet opening. The opening of the impact tube preferably is located at the cross-sectional area of the outlet opening, i.e., flush with the outlet opening. The static tube has a plurality of apertures, preferably 4 to 6, in the portion thereof located in the volume bounded by the cross-sectional area of the outlet opening and a distance of up to 12.5 percent of the duct inside diameter downstream of the outlet opening.

It is preferred that a perforated plate be mounted in the duct perpendicular to the duct axis upstream of the nozzle, more preferably at a length approximately nine times the duct inside diameter upstream of the nozzle. It is further preferred that the straight length of the duct upstream of the nozzle be at most ten times the duct inside diameter.

DETAILED DESCRIPTION OF THE INVENTION

Figures 1, 2:
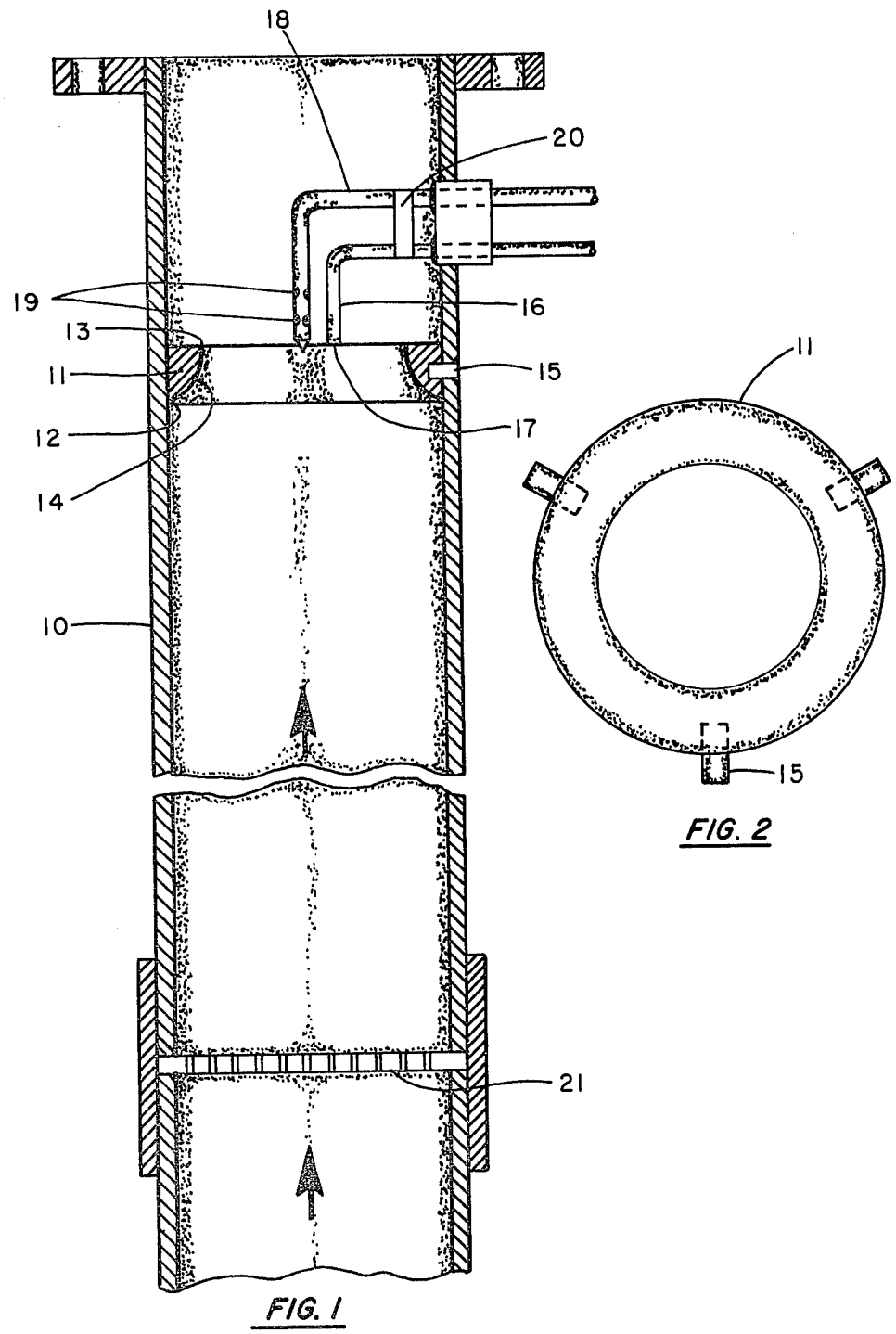
FIG. 1 is a partial vertical cross section of the gas supply duct 10 with perforated 21, flow nozzle 11 and pitot tube.
FIG. 2 is a plan view of the flow nozzle 11.

With reference to the accompanying drawings, like numbers indicate like apparatus. In FIG. 1, the arrow shows direction of air flow. Gas (air) entering duct 10 has just executed a 90 degree turn upstream. It then encounters perforated plate 21 which is mounted between two pieces of gas supply duct 10 screwed into a standard pipe coupling as shown. Perforated plate 21 has perforations with 0.125 inch (0.318 cm) diameters located on 0.188 inch (0.476 cm) centers, and a thickness of 0.063 inch (0.159 cm). Downstream, approximately nine times the inside diameter of gas supply duct 10, is located flow nozzle 11. [The inside diameter of gas supply duct 10 in the preferred embodiment is 4 inches (10.2 cm).] Flow nozzle 11 has inlet opening 12 for receiving the gas and outlet opening 13 for expelling the gas after it has been accelerated through throat 14 connecting inlet opening 12 and outlet opening 13. Throat 14 narrows in a curve from inlet opening 12 to outlet opening 13. Flow nozzle 11 is mounted in gas supply duct 10 coaxially and in fluid-tight relationship therewith. Pins 15 spaced at 120 degree intervals (see FIG. 2) are used to mount flow nozzle 11 in gas supply duct 10. These are aluminum pins having a diameter of 0.125 inch (0.318 cm). The cross-sectional area of gas supply duct 10 and the cross-sectional area of inlet opening 12 are substantially identical. The cross-sectional area of outlet opening 13 is 40 to 60, preferably 50, percent that of gas supply duct 10.

The small pressure drop through perforated plate 21 helps to equalize the gas flow. The contoured throat 14 of flow nozzle 11 helps flatten the velocity profile by removing air from the wall or inside diameter of gas supply duct 10 and directing it toward the center of the flow stream.

The pitot tube comprises an impact tube 16 and static tube 18 mounted in parallel through gas supply duct 10 downstream of flow nozzle 11. Both tubes 16 and 18 bend upstream toward flow nozzle 11 parallel to the duct axis. The opening 17 of impact tube 16 is located in the volume bounded by the cross-sectional area of outlet opening 13 and a distance of up to 6.25 percent of duct inside diameter downstream of outlet opening 13.

It is most preferred, as depicted in FIG. 1, that opening 17 be flush with the cross-sectional area of outlet opening 13. Static tube 18 has a plurality of apertures 19 in the portion of static tube 18 located in the volume bounded by the cross-sectional area of outlet opening 13 and a distance of up to 12.5 percent of the duct inside diameter downstream of outlet opening 13. Tubes 16 and 18 are made of brass and bonded together by strap 20, also made of brass and soldered to both of tubes 16 and 18. The function of strap 20 is to maintain the relationship between tubes 16 and 18. It is preferred that the portion of static tube 18 having perforations 19 therein be on the center line of gas supply duct 10. Impact tube 16 faces into the flowing gas and by intercepting a small portion of the flow reacts to the total pressure of the gas, measuring the impact pressure. Static tube 18 has four perforations 19 which face perpendicularly to the axis of flow and react to static pressure only, measuring static pressure. Although unshown, impact tube 16 and static tube 18 are connected, respectively, to the high and low pressure taps of a 0-2 inch Magnehelic ® differential pressure gage, the reading from which is used to determine the gas flow rate.

In use on a series of supply ducts of various configurations for quench air to a melt-spinning process, the device of FIG. 1 provided accurate determination of gas velocity, and hence gas flow rate in each duct, as shown by calibration of some of the duct flows.

We claim:

1. Apparatus for determining the velocity of a gas in a gas supply duct, comprising:

(a) a flow nozzle having an inlet opening for receiving the gas and an outlet opening for expelling the gas after it has been accelerated through a throat connecting the inlet opening and the outlet opening, the throat narrowing in a curve from the inlet opening to the outlet opening, the nozzle being mounted in the duct coaxially and in fluid-tight relationship therewith, the cross-sectional area of the duct and the cross-sectional area of the inlet opening being substantially identical, the cross-sectional area of the outlet opening being 40 to 60 percent that of the duct:

(b) a pitot tube, comprising an impact tube and a static tube mounted in parallel through the duct downstream of the nozzle and both bending upstream toward the nozzle parallel to the duct axis, the opening of the impact tube being located in the volume bounded by the cross-sectional area of the outlet opening and a distance of up to 6.25 percent of the duct inside diameter downstream of the outlet opening, the static tube having a plurality of apertures in the portion thereof located in the volume bounded by the cross-sectional area of the outlet opening and a distance of up to 12.5 percent of the duct inside diameter downstream of the outlet opening; and (c) a perforated plate, mounted in the duct perpendicular to the duct axis a length of approximately nine times the duct inside diameter upstream of the nozzle.

* * * * *